United States Patent Office 3,329,578
Patented July 4, 1967

3,329,578
ENZYME COMPOSITION AND PROCESS FOR PRODUCTION OF NON - CRYSTALLIZING, HIGH D.E. SYRUP
James Walter Faucett, Wyckoff, Walter Wilhelm Windish, Woodcliff Lake, and Leonard Anthony Zawodniak, Old Bridge, N.J. assignors to Miles Laboratories, Inc., Elkhart, Ind., a corporation of Indiana
No Drawing. Filed Sept. 8, 1964, Ser. No. 395,064
9 Claims. (Cl. 195—31)

This invention relates to an enzyme composition and to a process for using such enzyme composition to produce a non-crystallizing, high D.E. syrup. More particularly, it relates to a specific mixture of fungal alpha amylase and amyloglucosidase and to a process of using such enzyme mixture to produce a non-crystallizing syrup having about 67–69 D.E.

It is well known in the art that starch, such as corn starch, can be hydrolyzed to sugars, such as dextrose, in the presence of a mineral acid, such as hydrochloric acid. The extent of hydrolysis or conversion is determined from the total amount of copper reducing sugars present in the product expressed as dextrose. This value is the dextrose equivalent or D.E. Acid treatment has been widely used to obtain syrups having D.E. values up to about 60. When acid is employed to obtain a D.E. value in excess of about 60, the resulting syrup is generally unsatisfactory for several reasons. Acid-converted starch products contain appreciable amounts of dextrins. At D. E. values above about 60, the dextrin content of acid-converted starch syrups is substantial. Since the dextrins have no sweetening power, such syrups leave something to be desired when they are intended for use in confectionary syrups, for example. At D.E. values above about 60, acid-converted starch syrups also contain undesirable amounts of reversion sugars, such as gentiobiose, isomaltose, panose and the like. These reversion sugars are unfermentable by yeast, for example, and reduce the utility of acid-converted starch products as fermentation substrates for the production of other useful products. At D.E. values above about 60, acid-converted starch products also have an objectionable bitter taste and an inherent or incipient amber color which hampers their use for sweetening applications intended for human use.

There is a need in the sugar for a sugar syrup having a high D.E. (value over about 65) and which is non-crystallizing. The prior art acid conversion processes had a further disadvantage in that at D.E. values over about 60, the dextrose content was high enough to cause crystallization. Crystallization generally takes place when the dextrose content exceeds about 42 weight percent of the syrup dry solids.

In an effort to overcome the disadvantages of acid conversion, the art substituted an enzyme conversion. Enzymes, such as alpha amylase and amyloglucosidase, were employed to catalyze the starch hydrolysis. Enzyme converted syrups, for example, possess distinct advantages over acid-converted syrups. The enzyme converted syrups contain less dextrins and lower amounts of reversion sugars than syrups obtained by acid conversion. For a given syrup D.E. value the enzyme converted syrups contain less dextrose than the acid converted syrups. In order for the enzymes to be most effective in converting the starch to desirable sugars, the starch must be somewhat liquefied. Such liquefaction can be accomplished by partial acid conversion, as described above, or by an enzyme conversion. Syrups in the range of about 60 to 65 D.E. have been prepared by dual conversion processes employing either acid or enzymes for liquefaction and enzymes for saccharification. These dual conversion syrups were an improvement upon the simple all acid-converted syrups, and they contained sugars that are yeast fermentable to the extent of about 68–70 weight percent of the total carbohydrate content of the syrups. However, when such prior art dual conversion processes were employed to prepare a syrup having a D.E. over about 65, the syrup tended to crystallize due to the high dextrose concentration.

It is an object of the present invention to provide an enzyme composition which is capable of producing a syrup having a D.E. over about 65 and which is non-crystallizing.

It is a further object of the present invention to provide a process for producing a syrup having a D.E. over about 65 and which is non-crystallizing.

In accordance with the present invention, an enzyme composition is provided which comprises a mixture of fungal alpha amylase and amyloglucosidase. This enzyme composition is capable of producing a non-crystallizing, high D.E. syrup from a partially converted starch syrup. More particularly, the enzyme composition of the present invention comprises a mixture of fungal alpha amylase and amyloglucosidase which is equivalent in potency to a mixture comprising from about 78 to about 85 weight percent of a fungal alpha amylase having a nominal potency of about 262 mg./mg. amylase units as hereinafter defined and from about 15 to about 22 weight percent of an amyloglucosidase having a nominal potency of about 300 amyloglucosidase units per gram as hereinafter defined, said weight percents based on the total weight of fungal alpha amylase and amyloglucosidase. When the enzyme composition contains more than about 22 weight percent amyloglucosidase and less than about 78 weight percent of the fungal alpha amylase, the dextrose level of the resulting syrup will be too high and will cause crystallization. When the composition contains less than about 15 weight percent amyloglucosidase and more than about 85 weight percent fungal alpha amylase, the total dextrose plus maltose of the resulting syrup will be substantially less than about 75 weight percent. The preferred mixture contains fungal alpha amylase and amyloglucosidase in amounts equivalent in potency to a mixture comprising from about 79 to about 82 weight percent of a fungal alpha amylase having a nominal potency of about 262 mg./mg. amylase units and from about 18 to about 21 weight percent of amyloglucosidase having a nominal potency of about 300 amyloglucosidase units per gram, said weight percents based on the total weight of fungal alpha amylase and amyloglucosidase. Most preferably, the mixture contains fungal alpha amylase and amyloglucosidase in amounts equivalent in potency to a mixture comprising about 80 weight percent of a fungal alpha amylase having a nominal potency of about 262 mg./mg. amylase units and about 20 weight percent of amyloglucosidase having a nominal potency of about 300 amyloglucosidase units per gram, said weight percents based on the total weight of fungal alpha amylase and amyloglucosidase. Other materials, such as diatomaceous earth, dextrose and the like can be present in the enzyme mixture as inert fillers. Such fillers are employed to adjust the overall potency of the enzyme composition without affecting the relative potency ratios of the fungal alpha amylase and amyloglucosidase to each other.

The fungal alpha amylase, also known as alpha 1,4-glucan 4-glucanohydrolase, employed in the present invention is a well known material and can be obtained from fungal species, such as *Aspergillus oryzae*, by well known methods. The potency of the fungal alpha amylase is expressed in mg./mg. amylase units. These units express the number of mg. of reducing sugars, such as maltose, produced from 1 mg. of the enzyme under standard assay conditions. Amylase activity of 262 mg./mg. amylase units, for example, indicates that 1 mg. of fungal alpha amylase will produce 262 mg. of reducing sugars, expressed as maltose, under standard assay conditions. The standard assay conditions are: 1000 mg. soluble starch in a 2 weight percent aqueous solution; pH 5.0; 40° C.; 30 minutes' incubation; enzyme material to be tested adjusted to such a concentration that it will catalyze the hydrolysis of about 20 weight percent of the soluble starch during the 30 minutes. The maltose content of the enzyme converted starch is then determined by a well known iodometric method.

The amyloglucosidase, also known as glucamylase and alpha-1,4-glucan glucohydrolase, employed in the present invention is a well known material and can be obtained from fungal sources, such as *Aspergillus niger*, by well known methods. The potency of the amyloglucosidase is expressed in amylglucosidase units per gram. An amyloglucosidase unit is the amount of enzyme that will catalyze the production of one gram of reducing sugar expressed as dextrose in one hour under standard assay conditions. Thus an amyloglucosidase activity of 300 amyloglucosidase units per gram indicates that one gram of enzyme will produce 300 grams of reducing sugar expressed as dextrose in one hour under standard assay conditions. The standard assay conditions are 20 g. of soluble starch in a 4 weight percent aqueous solution; pH 4.2; 60° C.; 1 hour incubation; enzyme material to be tested adjusted to such a concentration that it will catalyze about 20-30 weight percent of the soluble starch during the 1 hour period. The dextrose content of the enzyme converted starch is then determined by the well known Schoorl method.

The amyloglucosidase which is useful in the present invention should preferably be substantially free from transglucosidase activity. Such amyloglucosidase can be obtained through well known refining treatment of a crude amyloglucosidase fungal extract liquor. This liquor is obtained by well known fermentation techniques. The refining of crude amyloglucosidase can be carried out by methods known in the prior art when needed to remove transglucosidase activity. Selective inorganic adsorbents, such as silicates, bentonite and the like; selective inorganic salt solutions, such as sodium chloride, ammonium sulfate and the like; and selective liquid organic solvents may be used in various combinations to attain the necessary degree of amyloglucosidase purity. In the case of organic solvents, any selective organic solvent which dissolves amyloglucosidase, but does not dissolve transglucosidase, and simultaneously is incapable of irreversibly inactivating amyloglucosidase, is suitable. Examples of such selective organic solvents are acetone and isopropanol. Alternatively, some strains of *Aspergillus niger* fungi are known to produce a culture liquor containing amyloglucosidase which is substantially free from transglucosidase activity. When such strains of fungi are employed, the resulting crude culture liquor can be used, without the necessity for subsequent refining, as a source of amyloglucosidase for use in the present invention.

The enzyme compositions of the present invention are expressed in relation to fungal alpha amylase having a nominal potency of about 262 mg./mg. amylase units and amyloglocosidase having a nominal potency of about 300 amyloglucosidase units per gram. It is recognized that enzymes of various potencies can be employed to form enzyme compositions of the present invention. The actual weight amounts of such enzymes, however, should be adjusted so that the resulting mixture is equivalent to the above described mixtures in potency relationship between the fungal alpha amylase and amyloglucosidase constituents.

The enzyme compositions of the present invention can be readily employed to produce non-crystallizing sugar syrups having D.E. of from about 67 to about 69, containing from about 38 to about 42 weight percent dextrose and also containing a total of dextrose and maltose greater than about 75 weight percent, said weight percents based on the total weight of the syrup dry solids. The process of the present invention comprises treating a partially hydrolyzed starch solution having a D.E. of from about 15 to about 30, preferably from about 16 to about 20, with the novel enzyme composition described above until a product syrup is obtained having the above described characteristics. In general, it is desirable that the process be carried out at a pH of at least 5 and at a temperature of less than about 56° C. for at least 72 hours. When the pH of the reaction mixture is below about 5, the hydrolysis reaction favors the formation of dextrose at the expense of maltose. This results in a dextrose level in the crystallizing range when the desired D.E. value of 67-69 is reached. The pH should preferably be in the range of from about 5.0 to about 5.3. At temperatures above 56° C. the reaction also favors the formation of dextrose at the expense of maltose. The temperature should preferably be from about 54° C. to about 56° C. The reaction time should generally be at least 72 hours in order to achieve the desired results. Preferably the reaction time should be from about 96 to about 130 hours. Once a sugar syrup of the desired properties is obtained, the enzymes composition can be inactivated by heating the reaction mixture to about 80–90° C. for about 30–40 minutes. This will prevent further sugar formation.

The partially hydrolyzed starch solution used as raw material for the present process can be obtained by well known acid or enzyme liquefaction processes. The solution should have a D.E. from about 15 to about 30 and should contain at least 45 weight percent dry solids based on total syrup weight. Preferably it should contain from about 45 to about 55 weight percent dry solids based on total syrup weight. At dry solids concentrations below about 45 weight percent, the reaction between the starch and the above novel enzyme composition tends to produce dextrose in the crystallizing range. At solids concentration above about 55 weight percent, excess amounts of enzyme composition are required to achieve desired results. The partially hydrolyzed starch solution should preferably be filtered to remove insoluble starch and particles of higher sugars prior to treating such starch solution with the novel enzyme composition. The resulting enzyme converted product has the advantage of containing a low level of non-fermentable products.

It is preferred to use about 0.03 percent by weight of the novel fungal alpha amylase-amyloglucosidase enzyme composition based on the total dry solids weight of the partially hydrolyzed starch solution. One may use from about 0.015 to about 0.035 percent by weight of the novel fungal alpha amylase-amyloglucosidase enzyme composition based on the total dry solids weight of the partially hydrolyzed starch solution.

The high D.E., high fermentables, non-crystallizing syrup produced by the compositions and processes of the present invention can be used in the baking, brewing confectionery and ice-cream industries with improved advantages over prior art materials. The high D.E. and high fermentables (dextrose plus maltose content over about 75 weight percent) enable more weight of fermentable carbohydrates to be handled per unit of syrup volume. The non-crystallizing feature prevents production slowdowns due to accidental solidification in the processing apparatus.

The invention will be further described in the following examples.

EXAMPLE 1

A mixture of 75 lb. of fungal alpha amylase having potency of 212 mg./mg. amylase units and 13.5 lb. of amyloglucosidase having a potency of 339 amyloglucosidase units per gram and substantially free from transglucosidase activity was blended with 13 lb. of diatomaceous earth. This composition contained enzymes in amounts equivalent in potency to an enzyme mixture containing 80 weight percent fungal alpha amylase having a potency of 262 mg./mg. amylase units and 20 weight percent amyloglucosidase having a potency of 300 amyloglucosidase units per gram said percents based on the total weight of these enzymes. This is shown by the following calculations:

Actual Materials Used:
   Fungal Alpha Amylase = $75 \times 212 = 15,900$
   Amyloglucosidase = $13.5 \times 339 = 4,570$
   Ratio = $3.48$ Standard:
   Fungal Alpha Amylase = $80 \times 262 = 20,950$
   Amyloglucosidase = $20 \times 300 = 6,000$
   Ratio = $3.49$ A 0.33 g. portion of this overall composition was added to 2000 g. of a corn starch hydrolyzate syrup having a D.E. of 18 and containing 50 weight percent solids. This syrup was obtained by conventional acid treatment of a corn starch slurry. The amount of enzyme composition including diatomaceous earth was 0.033 percent by weight based on the total dry solids weight of the syrup. The actual amount of enzymes was 0.03 percent by weight based on the total dry solids weight of the syrup. The pH of the syrup was maintained at 5.3 and the temperature was controlled at 55° C. for 102 hours. The resulting syrup had a D.E. of 67.6, a dextrose content of 40.3 weight percent and a maltose content of 39.9 weight percent. This high D.E. syrup thus contained 80.2 weight percent dextrose plus maltose (high fermentables) and was also non-crystallizing.

EXAMPLE 2

A mixture of 15.52 g. of fungal alpha amylase having a potency of 328 mg./mg. amylase units and 4.24 g. of amyloglucosidase having a potency of 380 amyloglucosidase units per gram and substantially free from transglucosidase activity was blended with 5.24 g. of diatomaceous earth. This composition contained enzymes in amounts equivalent in potency to an enzyme mixture containing 78 weight percent fungal alpha amylase having a potency of 262 mg./mg. amylase units and 22 weight percent amyloglucosidase having a potency of 300 amyloglucosidase units per gram, said percents based on the total weight of these enzymes. A 0.24 g. portion of this overall composition was added to 2000 g. of a corn starch hydrolyzate syrup having a D.E. of 18 and containing 50 weight percent solids. This syrup was obtained by conventional acid treatment of a corn starch slurry. The amount of enzyme composition including diatomaceous earth was 0.024 percent by weight based on the total dry solids weight of the syrup. The actual amount of enzymes was 0.019 weight percent based on the total dry solids weight of the syrup. The pH of the syrup was maintained at 5.3 and the temperature was controlled at 55° C. for 96 hours. The resulting syrup had a D.E. of 67.1, a dextrose content of 41.3 weight percent and a maltose content of 42.0 weight percent. This syrup was non-crystallizing and contained 83.3 weight percent dextrose plus maltose.

EXAMPLE 3

A mixture of 85 g. of fungal alpha amylase having a potency of 278 mg./mg. amylase units and 9.9 g. of amyloglucosidase having a potency of 455 amyloglucosidase units per gram and substantially free from transglucosidase activity was blended with 5.1 g. of dextrose filler. This composition contained enzymes in amounts equivalent in potency to an enzyme mixture containing 85 weight percent fungal alpha amaylase having a potency of 262 mg./mg. amylase units and 15 weight percent amyloglucosidase having a potency of 300 amyloglucosidase units per gram, said percents based on the total weight of these enzymes. A 0.33 g. portion of this overall composition was added to 2000 g. of a corn starch hydrolyzate syrup having a D.E. of 18 and containing 50 weight percent solids. This syrup was obtained by conventional acid treatment of a corn starch slurry. The amount of enzyme composition including dextrose filler was 0.033 percent by weight based on the total dry solids weight of the syrup. The actual amount of enzymes was 0.031 weight percent based on the total dry solids weight of the syrup. The pH of the syrup was maintained at 5.0 and the temperature was controlled at 55° C. for 120 hours. The resulting syrup had a D.E. of 68.8, a dextrose content of 42.6 weight percent and a maltose content of 44.5 weight percent. This syrup also was non-crystallizing and contained 87.1 weight percent dextrose plus maltose.

In summary, the present invention relates to a novel fungal alpha amylase-amyloglucosidase enzyme mixture which is capable of producing a non-crystallizing, high D.E., high fermentables sugar syrup from a starch slurry. It also relates to a process of using such novel enzyme mixture.

What is claimed is:

1. An enzyme composition capable of producing a non-crystallizing, high D.E. syrup which comprises a mixture of fungal alpha amylase and amyloglucosidase which is equivalent in potency to a mixture comprising from about 78 to about 85 weight percent of a fungal alpha amylase having a nominal potency of about 262 mg./mg. amylase units and from about 15 to about 22 weight percent of amyloglucosidase having a nominal potency of about 300 amyloglucosidase units per gram, said weight percents based on the total weight of fungal alpha amylase and amyloglucosidase.

2. An enzyme composition capable of producing a non-crystallizing, high D.E. syrup which comprises a mixture of fungal alpha amylase and amyloglucosidase which is equivalent in potency to a mixture comprising from about 79 to about 82 weight percent of a fungal alpha amylase having a nominal potency of about 262 mg./mg. amylase units and from about 18 to about 21 weight percent of amyloglucosidase having a nominal potency of about 300 amyloglucosidase units per gram, said weight percents based on the total weight of fungal alpha amylase and amyloglucosidase.

3. An enzyme composition capable of producing a non-crystallizing, high D.E. syrup which comprises a mixture of fungal alpha amylase and amyloglucosidase which is equivalent in potency to a mixture comprising about 80 weight percent of a fungal alpha amylase having a nominal potency of about 262 mg./mg. amylase units and about 20 weight percent of amyloglucosidase having a nominal potency of about 300 amyloglucosidase units per gram, said weight percents based on the total weight of fungal alpha amylase and amyloglucosidase.

4. An enzyme composition according to claim 1 which contains inert filler in addition to the fungal alpha amylase and amyloglucosidase.

5. An enzyme composition according to claim 4 wherein the inert filler is diatomaceous earth.

6. A process for producing a non-crystallizing, high D.E. syrup which comprises treating a partially hydrolyzed starch solution having a D.E. of from about 15 to about 30 with an enzyme composition comprising a mixture of fungal alpha amylase and amyloglucosidase which is equivalent in potency to a mixture comprising from about 78 to about 85 weight percent of a fungal alpha amylase having a nominal potency of about 262 mg./mg. amylase units and from about 15 to about 22 weight percent of amyloglucosidase having a nominal potency of about 300 amyloglucosidase units per gram, said weight percents based on the total weight of fungal alpha amylase and amyloglucosidase and continuing such treating until a syrup is produced having a D.E. from about 67 to about 69, containing from about 38 to about 42 weight percent dextrose, and also containing a total of dextrose and maltose greater than about 75 weight percent, said weight percents based on total weight of the syrup dry solids.

7. A process according to claim 6 wherein the enzyme composition comprises a mixture of fungal alpha amylase and amyloglucosidase which is equivalent in potency to a mixture comprising about 80 weight percent of a fungal alpha amylase having a nominal potency of about 262 mg./mg. amylase units and about 20 weight percent of amyloglucosidase having a nominal potency of about 300 amyloglucosidase units per gram, said weight percents based on the total weight of fungal alpha amylase and amyloglucosidase.

8. A process according to claim 6 wherein the fungal alpha amylase-amyloglucosidase enzyme mixture is present in an amount of from about 0.015 to about 0.035 weight percent based on the total dry solids weight of the partially hydrolyzed starch solution.

9. A process according to claim 6 wherein the fungal alpha amylase-amyloglucosidase enzyme mixture is present in an amount of about 0.03 weight percent based on the total dry solids weight of the partially hydrolyzed starch solution.

References Cited
UNITED STATES PATENTS

| | | | |
|---|---|---|---|
| 2,891,869 | 6/1959 | Langlois | 195—31 X |
| 3,067,066 | 12/1962 | Ehrenthal et al. | 195—31 X |
| 3,137,639 | 6/1964 | Hurst et al. | 195—31 |

A. LOUIS MONACELL, *Primary Examiner.*

L. M. SHAPIRO, *Assistant Examiner.*